(12) United States Patent
Qin

(10) Patent No.: US 6,765,971 B1
(45) Date of Patent: Jul. 20, 2004

(54) SYSTEM METHOD AND COMPUTER PROGRAM PRODUCT FOR IMPROVED NARROW BAND SIGNAL DETECTION FOR ECHO CANCELLATION

(75) Inventor: Liming Qin, Gaithersburg, MD (US)

(73) Assignee: Hughes Electronics Corp., El Segundo, CA (US)

(*) Notice: Subject to any disclaimer, the term of this patent is extended or adjusted under 35 U.S.C. 154(b) by 884 days.

(21) Appl. No.: 09/634,092

(22) Filed: Aug. 8, 2000

(51) Int. Cl.[7] .......................... H04L 7/00; H04L 27/06
(52) U.S. Cl. .................. 375/316; 375/365; 375/366; 375/224
(58) Field of Search .................. 375/224, 340, 375/360, 368, 316, 227, 228, 342, 366, 375, 365; 370/510, 511, 513, 286, 289

(56) References Cited

U.S. PATENT DOCUMENTS

| | | | | |
|---|---|---|---|---|
| 5,561,668 A | * | 10/1996 | Genter | 370/288 |
| 5,649,055 A | * | 7/1997 | Gupta et al. | 704/233 |
| 6,393,071 B1 | * | 5/2002 | Bourzeix | 375/340 |
| 6,490,554 B2 | * | 12/2002 | Endo et al. | 704/215 |
| 6,504,905 B1 | * | 1/2003 | Tsai et al. | 379/26.01 |

* cited by examiner

Primary Examiner—Young T. Tse
Assistant Examiner—Sam K. Ahn
(74) Attorney, Agent, or Firm—John T. Whelan

(57) ABSTRACT

A digital signal detection system, method and computer program product, including (a) partitioning a digital signal into a plurality of frames; (b) calculating a number of zero crossings of the digital signal within each frame; (c) determining whether or not an absolute value of a difference of the number of zero crossings in between frames is less than a first predetermined value; (d) determining whether or not a sum of the zero crossings of the frames is greater than or equal to a second predetermined value and less than or equal to a third predetermined value; (e) calculating a maximum amplitude of the digital signal for each of the frames; (f) calculating an average amplitude of the digital signal for all of the frames; (g) determining whether or not an absolute value of a difference between the maximum amplitude of a frame and the average amplitude is less than a fourth predetermined value times the average amplitude for each of the frames; and (h) determining that a frame contains a narrowband digital signal if the determining steps (c), (d), and (g) are met. The system, method and computer program product are applicable to signal detection circuits, echo cancellation circuits and telecommunications systems.

16 Claims, 6 Drawing Sheets

SYSTEM METHOD AND COMPUTER PROGRAM PRODUCT FOR IMPROVED NARROW BAND SIGNAL DETECTION FOR ECHO CANCELLATION

BACKGROUND OF THE INVENTION

1. Field of the Invention

The present invention relates generally to the field of telephone communications and more specifically to a method, system and computer program product for improved narrow frequency band signal detection for echo cancellation in telephone communication systems. The present invention includes use of various technologies described in the references identified in the appended LIST OF REFERENCES and cross-referenced throughout the specification by numerals in brackets corresponding to the respective references, the entire contents of which is incorporated herein by reference.

2. Discussion of the Background

The late 1950s marked the birth of echo control in the telecommunications industry with the development of the first echo-suppression devices. These systems, first employed to manage echo generated primarily in satellite circuits, were essentially voice-activated switches that transmitted a voice path and then turned off to block any echo signal. Although echo suppressers reduced echo caused by transmission problems in the network, they also resulted in choppy first syllables and artificial volume adjustment. In addition, they eliminated double-talk capabilities, greatly reducing the ability to achieve natural conversations. [1]

Echo-cancellation theory was developed in the early 1960s by AT&T Bell Labs, followed by the introduction of the first echo-cancellation system in the late 1960s by COMSAT TeleSystems (previously a division of COMSAT Laboratories). COMSAT designed the first analog echo canceller systems to demonstrate the feasibility and performance of satellite communications networks. Based on analog processes, these early echo-cancellation systems were implemented across satellite communications networks to demonstrate the network's performance for long-distance, cross-continental telephony. These systems were not commercially viable, however, because of their size and manufacturing costs. [1]

In the late 1970s, COMSAT TeleSystems developed and sold the first commercial analog echo cancellers, which were mainly digital devices with an analog interface to the network. The semiconductor revolution of the early 1980s marked the switch from analog to digital telecommunications networks. More sophisticated digital interface, multichannel echo-canceller systems were also developed to address new echo problems associated with long-distance digital telephony systems. Based on application-specific integrated circuit (ASIC) technology, these new echo cancellers utilized high-speed digital signal-processing techniques to model and subtract the echo from the echo return path. The result was a new digital echo-cancellation technique that outperformed existing suppression-based techniques, creating improved network performance. [1]

The 1990s have witnessed explosive growth in the wireless telecommunications industry, resulting from deregulation that has brought to market new analog and digital wireless handsets, numerous network carriers, and new digital network infrastructures such as TDMA, CDMA, and GSM. According to the Cellular Telecommunications Industry Association (CTIA), new subscribers are driving the growth of the wireless market at an annual rate of 40 percent. With wireless telephony being widely implemented and competition increasing as new wireless carriers enter the market, superior voice transmission quality and customer service have now become key determining factors for subscribers evaluating a carrier's network. Understanding and overcoming the inherent echo problems associated with such digital telecommunications networks will enable network operators and telephone companies to offer subscribers the network performance and voice quality they are demanding today. [1]

The detection of the presence of narrow frequency band signals in telephony circuits is of importance for the operation of voice based echo cancellation algorithms. The performance of the voice based echo cancellation algorithms typically degrade upon processing of such narrow frequency band signals. In addition, a control algorithm for the echo cancellation typically malfunctions upon processing of such narrow frequency band signals. The echo cancellation control algorithm uses narrow frequency band signal detection to schedule an adaptive echo filter update and to perform an echo return loss computation.

The above-noted conventional methods and systems typically use spectral analysis techniques in order to detect the presence of single and multiple frequency tonal signals. Some algorithms use frequency domain transforms, such as the Fast Fourier Transform (FFT), to convert samples into the frequency domain and then execute decision logic to identify tones. However, such transforms typically require extensive computations, resulting in the consumption of substantial system resources.

Other conventional systems and methods use a bank of limited bandwidth filters in the time domain to detect certain frequencies. However, such systems and methods typically require multiple filters to detect the presence of any predefined tonal signals, resulting in increased system complexity and requiring system resources proportional to a total number of taps of all of the filters.

In addition, the above-noted methods and systems typically only detect tonal signals, which generally is not sufficient for use in an echo canceller control unit.

SUMMARY OF THE INVENTION

Accordingly, an object of this invention is to provide a novel method, system and computer program product for improved narrow band signal detection based on time domain analysis.

Another object of this invention is to provide a novel method, system and computer program product for detection of narrow frequency band digitized signals in telephony circuits.

Another object of this invention is to provide a novel method, system and computer program product for detection of narrow frequency band digitized signals for echo cancellation in telephony circuits.

Another object of this invention is to provide a novel method, system and computer program product for detection of narrow frequency band digitized signals in telephony circuits using zero crossing and amplitude analysis techniques.

Another object of this invention is to provide a novel method, system and computer program product for detection of narrow frequency band digitized signals for use in satellite-based digital telephony and data communication network systems.

The above and other objects are achieved according to the present invention by providing a novel digital signal detection system, method and computer program product, including (a) partitioning a digital signal into a plurality of frames; (b) calculating a number of zero crossings of the digital signal within each frame; (c) determining whether or not an absolute value of a difference of the number of zero crossings in between frames is less than a first predetermined value; (d) determining whether or not a sum of the zero crossings of the frames is greater than or equal to a second predetermined value and less than or equal to a third predetermined value; (e) calculating a maximum amplitude of the digital signal for each of the frames; (f) calculating an average amplitude of the digital signal for all of the frames; (g) determining whether or not an absolute value of a difference between the maximum amplitude of a frame and the average amplitude is less than a fourth predetermined value times the average amplitude for each of the frames; and (h) determining that a frame contains a narrowband digital signal if the determining steps (c), (d), and (g) are met.

Advantageously, the present invention not only detects single frequency tones but also narrow frequency band signals that are not necessarily tonal signals. In addition, since the present invention operates in the time domain, the present invention requires limited system resources, and uses simple decision logic, so that a fast detection can be achieved, as compared to conventional frequency domain detection techniques.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
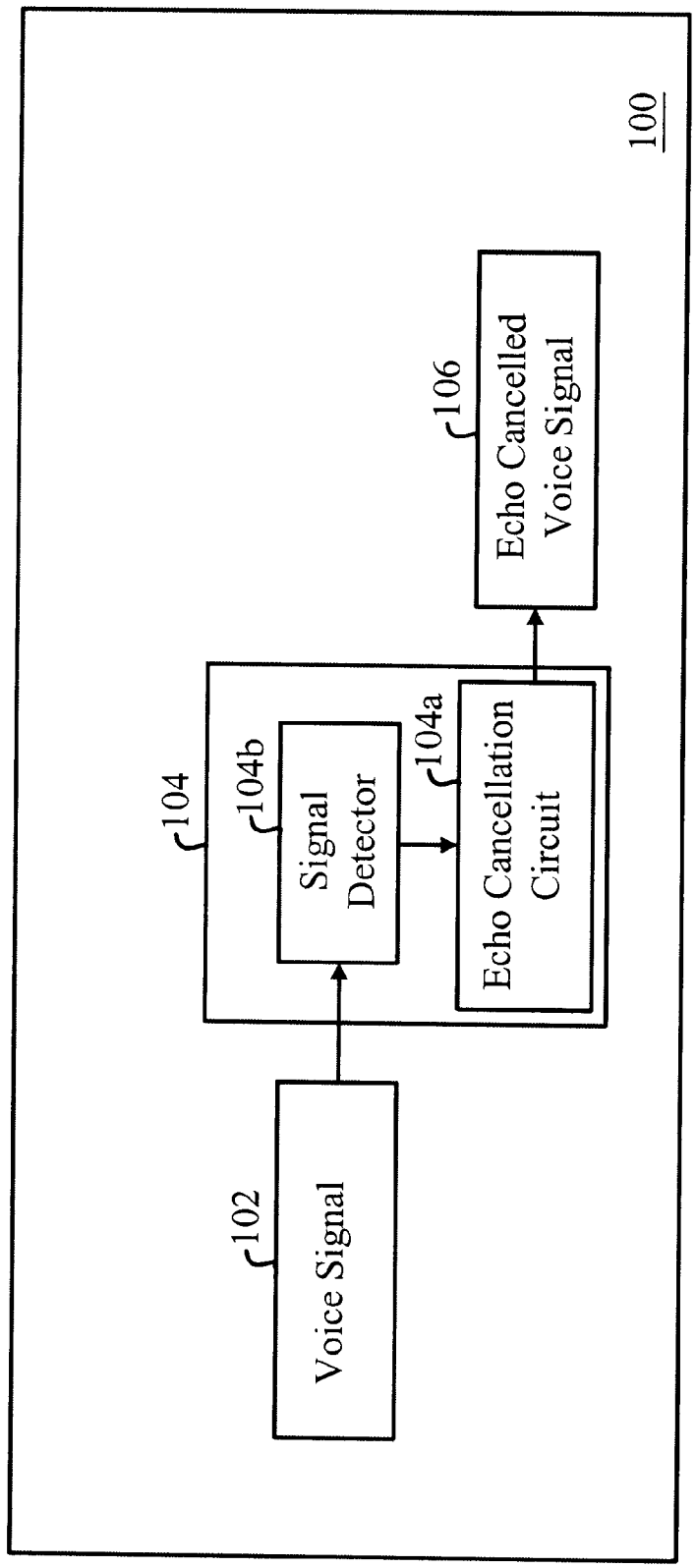
FIG. 1 is a block diagram for illustrating the basic system, according to the present invention.

Referring now to the drawings, wherein like reference numerals designate identical or corresponding parts throughout the several views, and more particularly to FIGS. 1–6 thereof, there are shown various embodiments of the present invention, as will now be described.

FIG. 1 is a block diagram for illustrating a basic telecommunications system 100, according to the present invention. In the telecommunications system 100 of FIG. 1, an echo cancellation processor 104, the output of which is an echo-cancelled version 106 of the input voice signal 102, receives a voice signal 102. The echo cancellation processor 104 includes an echo cancellation circuit 104a and a signal detector 104b. The signal detector 104b, according to the present invention, will now be described with reference to FIGS. 2–6.

The signal detector 104b implements an algorithm that exploits the periodical nature of narrow frequency band signals. The inputs to the algorithm are sampled audio data in a frame of a certain length. The frame is divided into multiple sub-frames and zero crossings and maximum amplitudes thereof are analyzed to determine the presence of the narrow frequency band signals.

A zero crossing occurs when the arithmetic values of two consecutive samples have different signs, one positive and another negative. The number of zero crossings in a sub-frame is the total number of such occurrences in the sub-frame. For zero mean signals, the number of zero crossings reflects the frequency information of the data samples.

The algorithm checks the variation of the numbers among all sub-frames. For narrow frequency band signals the variation is small. The variation, however, is large if the signals have a wide span in frequency domain.

Amplitude is the absolute value of a digitized sample. The variation of the maximum amplitudes among all sub-frames reflects the randomness of the data samples in the frame. The narrow frequency band signals have a periodical nature and such variation is small.

Figure 2:
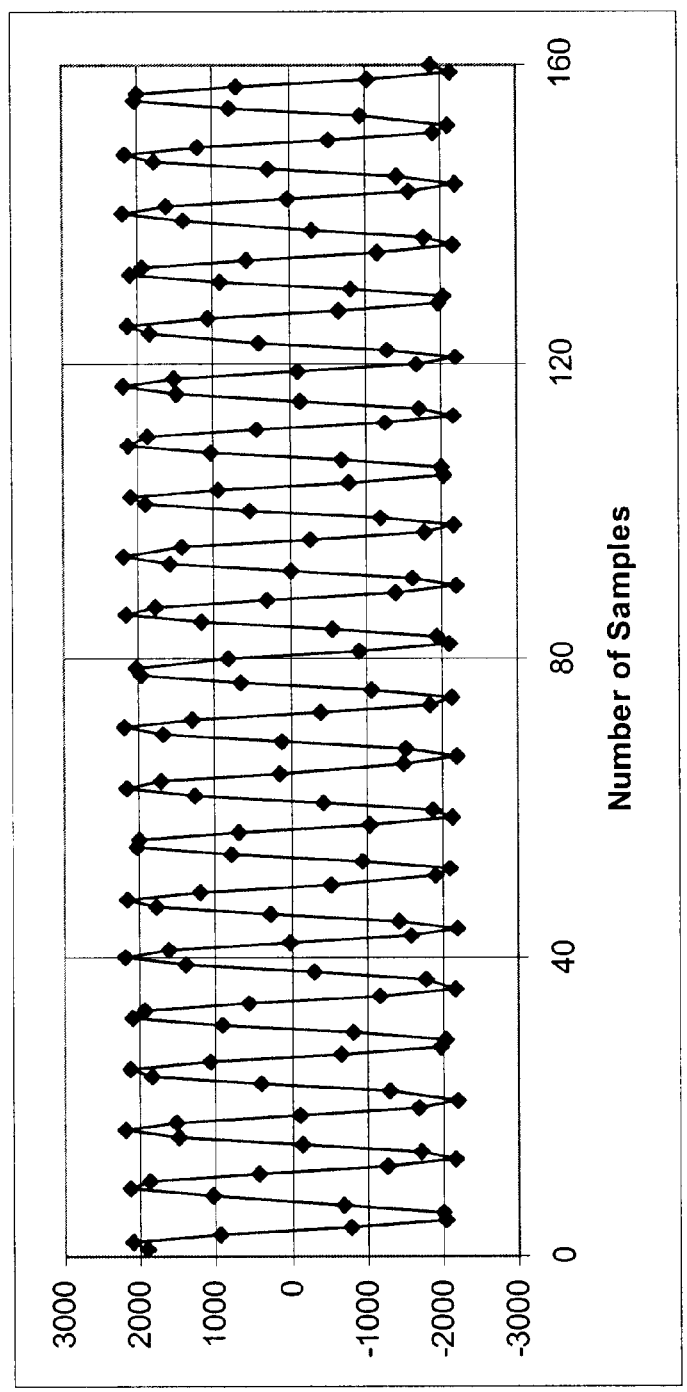
FIG. 2 is a diagram of a sampled 650 Hz sinusoid signal for illustrating the operation of the present invention.
Figure 3:
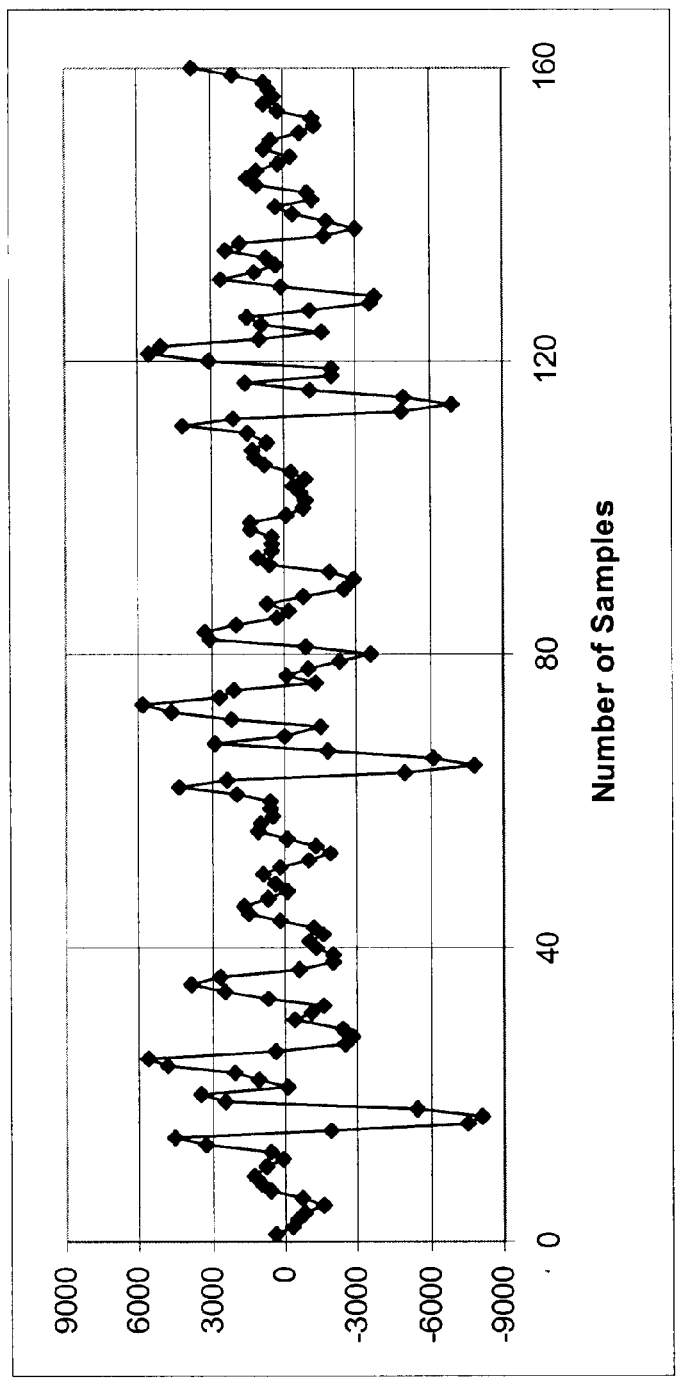
FIG. 3 is a diagram of a sampled exemplary human speech signal for illustrating the operation of the present invention.
Figure 4:
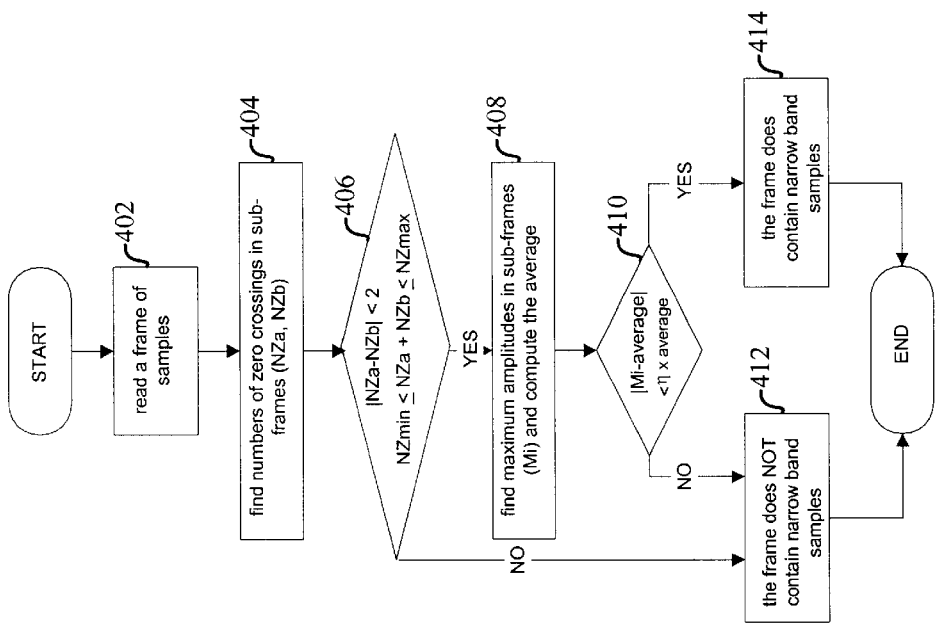
FIG. 4 is flow chart for illustrating the operation of the present invention.

Examples of 20 ms long frames of data sampled at 8000 Hz are shown in FIG. 2 and 3. FIG. 2 illustrates a single frequency sinusoid signal, while FIG. 3 illustrates audio data from typical human speech.

The algorithm analyzes audio signals sampled at 8000 Hz in a time duration of $\Delta$ (e.g., equal to 20 ms). The algorithm executes the following procedures and examines conditions for decision-making. The values in the parentheses correspond to a preferred embodiment of the present invention. The flow chart of FIG. 4 and following text describe the procedures of the algorithm to detect narrow frequency band signals, according to the present invention.

At step S402, the samples are read in and divided into two equal sub-frames of $\Delta/2$ (e.g., equal to 10 ms), sub-frame A and sub-frame B. At step S404, the procedure finds the numbers of zero crossings in the two sub-frames and examines the following conditions at step S406:

$|NZa-NZb|<2$ $NZ\min \leq NZa+NZb \leq NZ\max$

Where NZa and NZb are the respective number of zero crossings in sub-frames A and B, NZmin (e.g., equal to binary 11) and NZmax (e.g., equal to binary 111) represent the zero crossing cut off values for the low and high frequency limits, respectively.

At steps S408 and S410, the samples are next divided into four equal sub-frames of $\Delta/4$ (e.g., equal to 5 ms), sub-frames 1, 2, 3, and 4, absolute maximum amplitudes, M1, M2, M3 and M4, in each of the sub-frames are calculated and the following conditions are examined:

$$\bar{M} = \frac{1}{4}\sum_{i=1}^{4} Mi$$

$|Mi-\bar{M}|>\eta \cdot \bar{M}$ $(i=1,2,3,4)$

Where $\bar{M}$ is the average maximum amplitude, Mi is the maximum amplitude of the ith sub-frame and $\eta$ (e.g., equal to 1/16) represents the maximum allowed deviation from the average maximum amplitude.

If all conditions in steps S406 and S410 are satisfied, the algorithm determines that the samples are narrow frequency band signals at step S414. However, if at least one of the above listed conditions in steps S406 and S410 is not satisfied, the algorithm disqualifies the samples as narrow frequency band signals at step S412.

The algorithm according to the present invention can be implemented using, for example, a general-purpose computer, a general-purpose processor, a Digital Signal Processor (DSP), such as a Texas Instruments TMS320C54x DSP, etc., as will be appreciated by those skilled in the relevant art(s). Using, for example, the TMS320C54x DSP, it typically takes 0.075 MIPS to process audio data sampled at 8000 Hz, with a frame size is 20 ms. The algorithm typically requires no additional memory allocation for intermediate data storage. The algorithm detected all single frequency tones and found narrow frequency band signals in speech signals that typically occur in speech signals at few percent levels.

Figure 5:
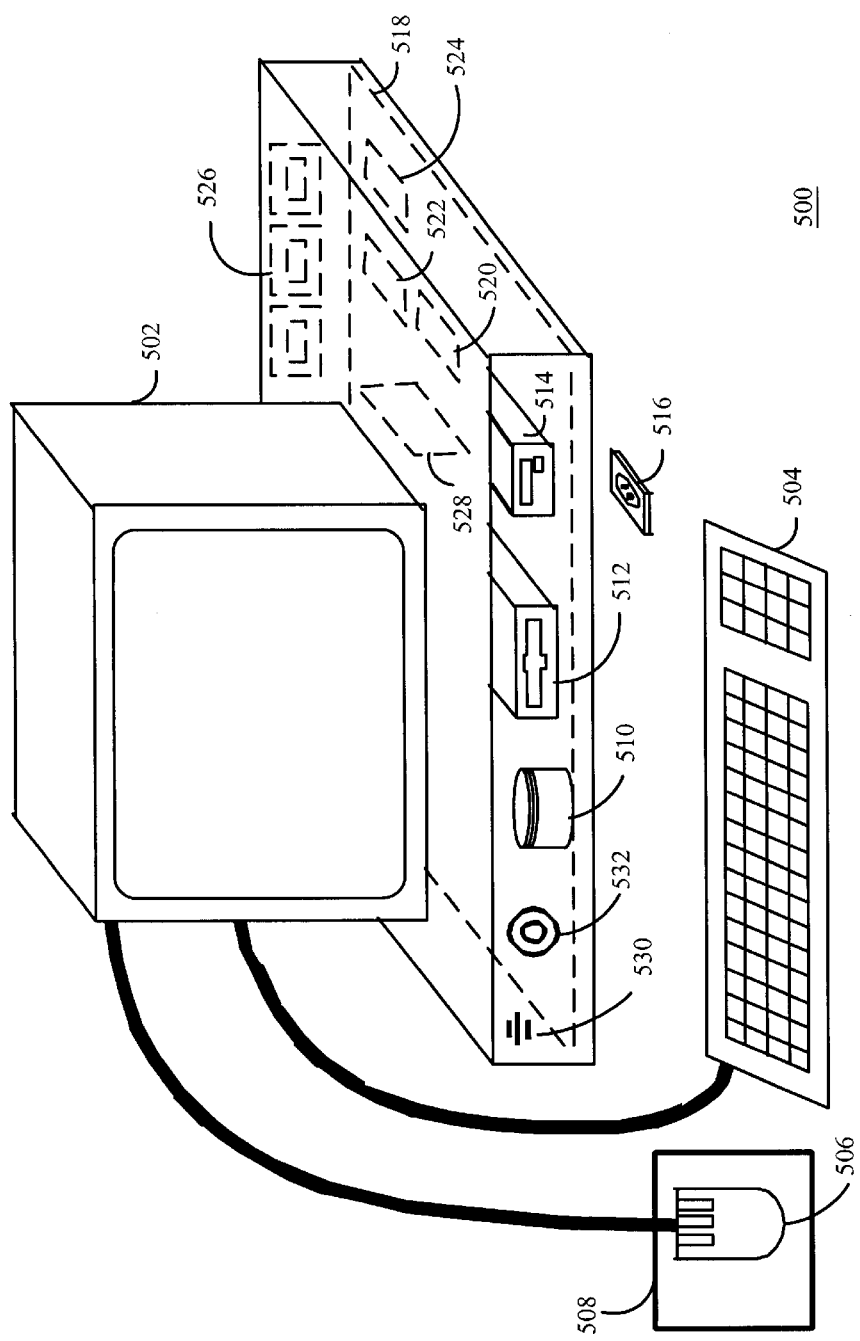
FIG. 5 is a schematic illustration of a general-purpose computer, which can be programmed according to the teachings of the present invention.

FIG. 5 is a schematic illustration of a general-purpose computer 500, which can be programmed according to the teachings of the present invention. In FIG. 5, the computer 500 implements the processes of the present invention, wherein the computer includes, for example, a display device 502 (e.g., a touch screen monitor with a touch-screen interface, etc.), a keyboard 504, a pointing device 506, a mouse pad or digitizing pad 508, a hard disk 510, or other fixed, high density media drives, connected using an appropriate device bus (e.g., a SCSI bus, an Enhanced IDE bus, an Ultra DMA bus, a PCI bus, etc.), a floppy drive 512, a tape or CD ROM drive 514 with tape or CD media 516, or other removable media devices, such as magneto-optical media, etc., and a mother board 518. The mother board 518 includes, for example, a processor 520, a RAM 522, and a ROM 524 (e.g., DRAM, ROM, EPROM, EEPROM, SRAM, SDRAM, and Flash RAM, etc.), I/O ports 526, which may be used to couple to external devices, and optional special purpose logic devices (e.g., ASICs, etc.) or configurable logic devices (e.g., GAL and re-programmable FPGA) 528 for performing specialized hardware/software functions, such as sound processing, image processing, signal processing, neural network processing, automated classification, modulation/demodulation, digital-to-analog/analog-to-digital conversion, etc., a microphone 530, and a speaker or speakers 532.

Figure 6:
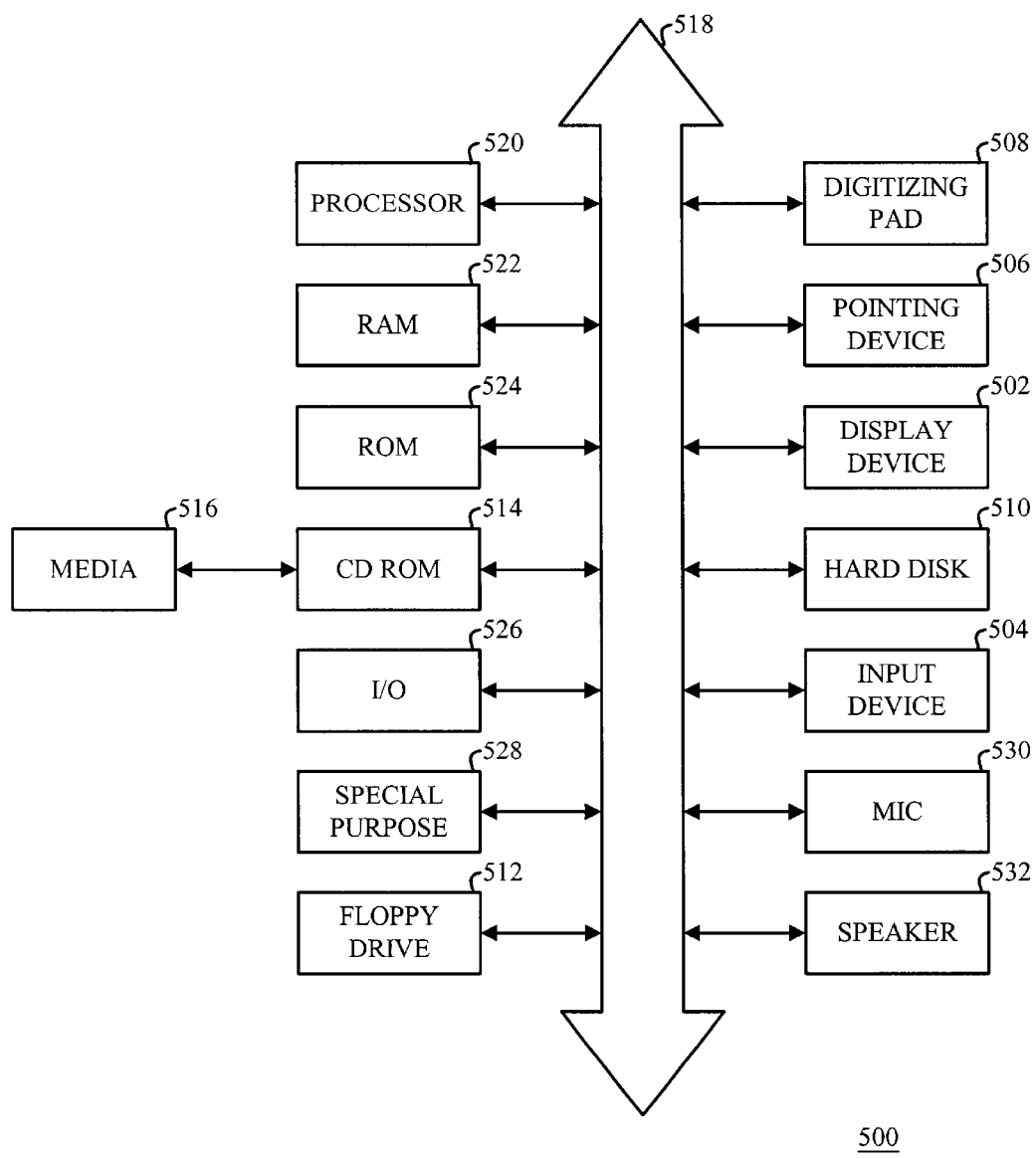
FIG. 6 is a schematic illustration of a general-purpose microprocessor-based system, which can be programmed according to the teachings of the present invention.

FIG. 6 is a schematic illustration of a general-purpose microprocessor-based or digital signal processor (DSP)-based system 500, which can be programmed according to the teachings of the present invention. In FIG. 6, the system 500 implements the processes of the present invention and may include, for example, a display device 502 (e.g., a liquid crystal display (LCD), etc.), a keyboard 504, a pointing device 506, a mouse pad or digitizing pad 508, a hard disk 510, or other fixed, high density media drives, connected using an appropriate device bus (e.g., a SCSI bus, an Enhanced IDE bus, an Ultra DMA bus, a PCI bus, etc.), a floppy drive 512, a tape or CD ROM drive 514 with tape or CD media 516, or other removable media devices, such as magneto-optical media, etc., and a mother board or printed circuit board 518. The board 518 includes, for example, a processor 520, such as general-purpose microprocessor or DSP, a RAM 522, and a ROM 524 (e.g., DRAM, ROM, EPROM, EEPROM, SRAM, SDRAM, and Flash RAM, etc.), I/O ports 526, which may be used to couple to external devices, and optional special purpose logic devices (e.g., ASICs, etc.) or configurable logic devices (e.g., GAL and re-programmable FPGA) 528 for performing specialized hardware/software functions, such as sound processing, image processing, signal processing, neural network processing, automated classification, modulation/demodulation, digital-to-analog/analog-to-digital conversion, etc., a microphone 530, and a speaker or speakers 532.

As stated above, the system includes at least one computer readable medium. Examples of computer readable media are compact discs, hard disks, floppy disks, tape, magneto-optical disks, PROMs (EPROM, EEPROM, Flash EPROM), DRAM, SRAM, SDRAM, etc. Stored on any one or on a combination of computer readable media, the present invention includes software for controlling both the hardware of the computer 500 and for enabling the computer 500 to interact with a human user. Such software may include, but is not limited to, device drivers, operating systems and user applications, such as development tools. Such computer readable media further includes the computer program product of the present invention for performing any of the processes according to the present invention, described above. The computer code devices of the present invention can be any interpreted or executable code mechanism, including but not limited to scripts, interpreters, dynamic link libraries, Java classes, and complete executable programs, etc.

Accordingly, the mechanisms and processes set forth in the present invention may be implemented using one or more conventional general-purpose microprocessors or computers programmed according to the teachings in the present invention. Appropriate software coding can readily be prepared by programmers of ordinary skill in the computer art(s) based on the teachings of the present invention. However, the present invention also may be implemented by the preparation of application-specific integrated circuits or by interconnecting an appropriate network of conventional component circuits.

The present invention thus also includes a computer-based product which may be hosted on a storage medium and include instructions which can be used to program a general-purpose microprocessor or computer to perform processes in accordance with the present invention. This storage medium can include, but is not limited to, any type of disk including floppy disks, optical disks, CD-ROMs, magneto-optical disks, ROMs, RAMs, EPROMs, EEPROMs, flash memory, magnetic or optical cards, or any type of media suitable for storing electronic instructions.

Although the present invention is described in terms of application to telephony circuits, the present invention may be applied to other types of systems where narrow band signal detection is required, as will be appreciated by those skilled in the relevant art(s).

Accordingly, numerous modifications and variations of the present invention are possible in light of the above teachings. It is therefore to be understood that within the scope of the appended claims, the invention may be practiced otherwise than as specifically described herein.

List of References

[1] "Echo Cancellation Tutorial," The International Engineering Consortium, <http://www.webproforum.com/echo_cancel/index.html>.

What is claimed as new and desired to be secured by Letters Patent of the United States is:

1. A digital signal detection method, comprising:
   (a) partitioning a digital signal into a plurality of frames;

(b) calculating a number of zero crossings of the digital signal within each frame;

(c) determining whether or not an absolute value of a difference of the number of zero crossings in between frames is less than a first predetermined value;

(d) determining whether or not a sum of the zero crossings of the frames is greater than or equal to a second predetermined value and less than or equal to a third predetermined value;

(e) calculating a maximum amplitude of the digital signal for each of the frames;

(f) calculating an average amplitude of the digital signal from all of the frames;

(g) determining whether or not an absolute value of a difference between said maximum amplitude for each of the frames and said average amplitude from all of the frames is less than a fourth predetermined value times said average amplitude from all of the frames; and (h) determining that the plurality of frames contain a narrowband digital signal if the determining steps (c), (d), and (g) are met.

2. The method of claim 1, wherein the first predetermined value is 2.

3. The method of claim 1, wherein the second predetermined value is binary 11.

4. The method of claim 1, wherein the third predetermined value is binary 111.

5. The method of claim 1, wherein the fourth predetermined value is $1/16$.

6. The method of claim 1, wherein the digital signal is sampled at 8000 Hz.

7. The method of claim 1, wherein step (a) comprises:

(a-1) partitioning the digital signal into two 10 ms frames.

8. The method of claim 1, wherein, prior to step (e), the following step is performed:

(e-1) partitioning the plurality of frames into a plurality of sub-frames.

9. The method of claim 8, wherein the step (e-1) comprises:

partitioning the digital signal into four 5 ms subframes.

10. The method of claim 1, wherein step (c) comprises:

(c-1) satisying the following condition:

$$|NZa-NZb|<th1,$$

where NZa and NZb are the respective number of zero crossings in the plurality of frames and th1 is the first predetermined value.

11. The method of claim 1, wherein step (d) comprises:

(d-1) satisfying the following condition:

$$NZ\min \leq NZa+NZb \leq NZ\max,$$

where NZa and NZb are the respective number of zero crossings in the plurality of frames and NZmin and NZmax are the second and third predetermined values, respectively.

12. The method of claim 1, wherein step (g) comprises:

(g-1) satisfying the following condition:

$$|Mi-\bar{M}|<\eta \cdot \bar{M}\ (i=1,2,3,4),$$

where $\bar{M}$ is the average maximum amplitude over all the frames, Mi is the maximum amplitude of an ith subframe and $\eta$ is the fourth predetermined value.

13. A signal detection circuit configured to perform the steps recited in any one of claims 1–12.

14. An echo cancellation circuit configured to perform the steps recited in any one of claims 1–12.

15. A telecommunications system configured to perform the steps recited in any one of claims 1–12.

16. A computer storage medium storing a computer program configured to perform the steps recited in any one of claims 1–12.

* * * * *